(12) United States Patent
Adachi

(10) Patent No.: US 6,973,204 B2
(45) Date of Patent: Dec. 6, 2005

(54) SIGNATURE COLLATION APPARATUS, SIGNATURE COLLATION METHOD, AND PROGRAM WHICH CAUSES COMPUTER TO EXECUTE THE METHOD

(75) Inventor: Kazutaka Adachi, Hyogo (JP)

(73) Assignee: Glory Ltd., Hyogo (JP)

( * ) Notice: Subject to any disclaimer, the term of this patent is extended or adjusted under 35 U.S.C. 154(b) by 793 days.

(21) Appl. No.: 10/095,119

(22) Filed: Mar. 12, 2002

(65) Prior Publication Data

US 2003/0007691 A1    Jan. 9, 2003

(30) Foreign Application Priority Data

Jul. 6, 2001  (JP) .............................. 2001-206729

(51) Int. Cl.⁷ .............................. G06K 9/00; G06K 9/68
(52) U.S. Cl. ...................... 382/119; 382/123; 382/187; 382/188; 382/215; 382/219
(58) Field of Search ........................ 382/119, 219, 123, 382/215

(56) References Cited

U.S. PATENT DOCUMENTS

| | | | | |
|---|---|---|---|---|
| 3,979,722 A | * | 9/1976 | Sakoe | 382/215 |
| 4,985,928 A | * | 1/1991 | Campbell et al. | 382/119 |
| 5,251,265 A | * | 10/1993 | Dohle et al. | 382/123 |
| 5,802,200 A | * | 9/1998 | Wirtz | 382/119 |
| 5,930,380 A | * | 7/1999 | Kashi et al. | 382/119 |
| 5,940,534 A | * | 8/1999 | Wakahara et al. | 382/187 |
| 6,018,591 A | * | 1/2000 | Hull et al. | 382/186 |
| 6,393,138 B1 | * | 5/2002 | Chai | 382/119 |
| 6,424,728 B1 | * | 7/2002 | Ammar | 382/119 |
| 6,430,308 B1 | * | 8/2002 | Ogawa et al. | 382/119 |
| 6,658,149 B1 | * | 12/2003 | Wakahara et al. | 382/215 |
| 2002/0181782 A1 | * | 12/2002 | Monden | 382/215 |

OTHER PUBLICATIONS

Mizukami et al., "A Signature Verification Method Based on the Extracted Displacement Function," The Institute of Electronics, Information and Communication Engineers, Technical Report of IEICE, PRMU98-147 (Dec. 1998), pp. 87-93.

* cited by examiner

*Primary Examiner*—Bhavesh M. Mehta
*Assistant Examiner*—Utpal Shah
(74) *Attorney, Agent, or Firm*—Foley & Lardner LLP

(57) ABSTRACT

It is controlled by a non-transformation coefficient calculated by a non-transformation calculation section, whether feedback is performed or not. When the feedback is ended, a collation value calculation section calculates a collation value (coincidence coefficient×non-transformation coefficient). A display process section compares the collation value with a predetermined threshold value. When the collation value is a threshold value or more, a signature is decided as a true signature, and the transformation-corrected image and the reference image are displayed such that these images overlap.

11 Claims, 13 Drawing Sheets

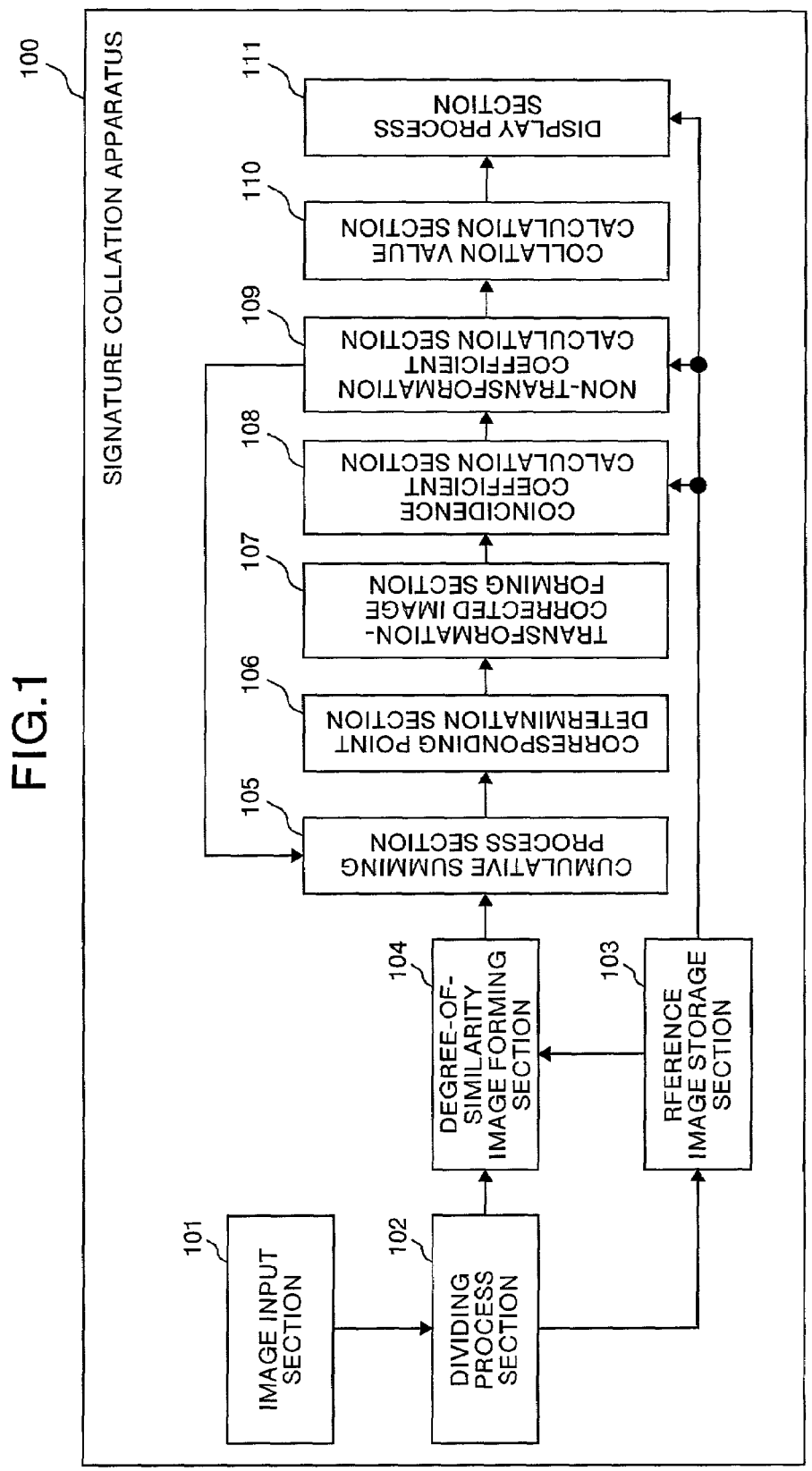

REFERENCE IMAGE

INPUT IMAGE

INITIAL STATE (COINCIDENCE COEFFICIENT: 75.3%, NON-TRANSFORMATION COEFFICIENT: 25.1%)

THE THIRD UPDATING (COINCIDENCE COEFFICIENT: 79.2%, NON-TRANSFORMATION COEFFICIENT: 44.4%)

THE TENTH UPDATING (COINCIDENCE COEFFICIENT: 79.6%, NON-TRANSFORMATION COEFFICIENT: 85.7%)

SIGNATURE COLLATION APPARATUS, SIGNATURE COLLATION METHOD, AND PROGRAM WHICH CAUSES COMPUTER TO EXECUTE THE METHOD

FIELD OF THE INVENTION

The present invention relates to a signature collation apparatus, a signature collation method, and a program which causes a computer to execute the method.

BACKGROUND OF THE INVENTION

Heretofore, in not only Europe and the United States but also Japan, confirmation performed by a signature (sign) is used as one of personal authentication techniques. For example, when commodities are purchased by a credit card, a seal is not required, and a signer is confirmed by her/his signature.

However, when the confirmation by the signature is to be performed by only visual check of a person in charge, the other cannot be easily prevented from being in the disguise of the signer. For this reason, two types of conventional signature collation techniques called an on-line signature collation technique and an off-line signature collation technique are known.

The on-line signature collation technique is a technique which decides whether a signature is written by the signer or not on the basis of various pieces of dynamic information such as a handwriting speed of a pen, a handwriting pressure, the positions of a start point and an end point, and a locus of the pen. In contrast to this, the off-line signature collation technique is a technique which decides a signature is true or false by using only the shape of the signature left on the paper as decision material without using these pieces of dynamic information or real time information.

In this manner, the two types of signature collation techniques are known. The later off-line signature collation technique particularly attracts attentions because the technique can be popularly applied without equipment to acquire dynamic information and it can be applied widely. In contrast to this, in the off-line signature collation technique, corresponding points between the image (reference image) of a registered signature and the image (input image) of a new input signature must be searched, and the correlations of the corresponding points must be accurately obtained. This is because it is actually impossible to reproduce exactly the same signature as the registered signature.

For this reason, for example, "Yoshiki MIZUKAMI et al., "A signature verification method based on the extracted displacement function", THE INSTITUTE OF ELECTRONICS, INFORMATION AND COMMUNICATION ENGINEERS, TECHNICAL REPORT OF IEICE, PRMU 98–147 (December 1998), pp. 87–93" discloses the following technique. That is, after displacement extraction is performed between a collation signature and a genuine signature, the truth or falsehood of the collation signature is decided by an Euclidean distance based on the obtained displacement function.

However, according to this conventional technique, an Euclidean distance between an input image subjected to displacement (which is not an input image itself) and a reference image is used as an evaluation reference. For this reason, when an input image has many transformations, it is a considerable problem how to displace the input image. According to the conventional technique, two types of displacement functions which smoothly displace an image in horizontally and vertically while avoiding extreme local displacement are employed. However, in fact, with only the displacement functions, it may be impossible to cope with a general transformation.

More specifically, when the technique tries to cope with a relative large transformation by using the displacement functions, very long process time is required to calculate the Euclidean distance. In contrast to this, when the technique tries to cope with a relatively small transformation, the technique cannot cope with a general transformation. For this reason, a delay in collation may be increased, or an accuracy of collation may be deteriorated. It is difficult to perform an accurate and efficient (rapid) decision of truth or falsehood in consideration of transformations of input images.

Therefore, when off-line signature collation is to be performed, it is a very important issue to efficiently perform an accurate decision of truth or falsehood in consideration of transformations of an input image.

SUMMARY OF THE INVENTION

It is object to provide a signature collation apparatus and a signature collation method which can efficiently perform an accurate decision of truth or falsehood in consideration of transformations of an input image when off-line collation is performed and a program which causes a computer to execute the method.

According to one aspect of the present invention, there is provided a signature collation apparatus which performs, on the basis of the degree of coincidence between an input image of a signature and a reference image of a signature to be compared with the input image, signature collation between the input image and the reference image, including, a corresponding point searching unit which searches corresponding points between the input image and the reference image, and a calculation unit which, on the basis of a transformation-corrected image obtained by correcting transformation of the signature of the input image on the basis of the corresponding points searched by the corresponding point searching unit, a coincidence coefficient of the reference image and anon-transformation coefficient between the input image and the reference image, calculates a collation value between the transformation-corrected image and the reference image.

According to another aspect of the present invention, there is provided a signature collation method which performs, on the basis of a degree of coincidence between an input image of a signature and a reference image of a signature to be compared with the input image, signature collation between the input image and the reference image, including, a corresponding point searching step of searching corresponding points between the input image and the reference image, and a calculation step of, on the basis of a transformation-corrected image obtained by correcting transformation of the signature of the input image on the basis of the corresponding points searched by the corresponding point searching step, a coincidence coefficient of the reference image and anon-transformation coefficient between the input image and the reference image, calculating a collation value between the transformation-corrected image and the reference image.

According to still another aspect of the present invention, there is provided a program which causes a computer to execute the method described above.

Other objects and features of this invention will become understood from the following description with reference to the accompanying drawings.

BRIEF DESCRIPTION OF THE DRAWINGS

FIG. 1 is a functional block diagram which shows the configuration of a signature collation apparatus according to an embodiment of the present invention.

DETAILED DESCRIPTIONS

Figure 2A:
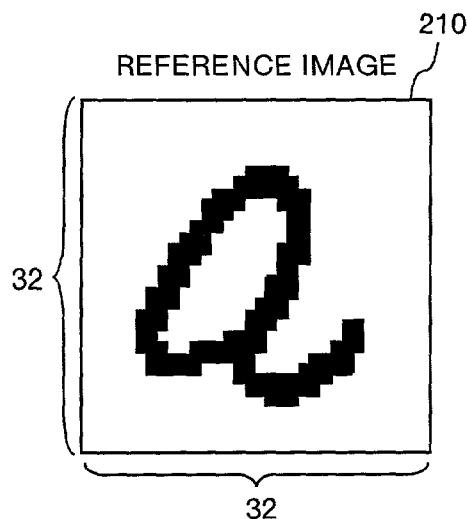
FIGS. 2A and 2B are diagrams which show a reference image and an input image which are used in the embodiment, respectively.

An embodiment of a signature collation apparatus, a signature collation method, and a program which causes a computer to execute the method according to the present invention will be described below.

FIG. 1 is a functional block diagram which shows the configuration of a signature collation apparatus used in this embodiment. A signature collation apparatus 100 shown in FIG. 1 is constituted by, (1) a degree-of-similarity image forming step of forming a degree-of-similarity image representing the degree of similarity between partial input images obtained by dividing an input image of a signature and partial reference images obtained by dividing the reference image of a signature registered in advance, (2) a corresponding point determination step of determining optimum corresponding points on the basis of a result obtained by cumulative-summing a plurality of degree-of-similarity images, and (3) a collation step of forming a transformation-corrected image on the basis of the corresponding points and performing a collation process on the basis of a collation value calculated from a coincidence coefficient between the formed transformation-corrected image and the reference image and a non-transformation coefficient between the input image and the reference image.

More specifically, (1) in the degree-of-similarity image forming step, for example, relative values are sequentially calculated while partial reference images each having a size of 7×7 pixels are moved in partial input images each having a size of 21×21 pixels, and degree-of-similarity images having the correlation values as pixel values are formed. For this reason, the degree-of-similarity images indicate the degrees of similarity between the central points on the partial reference images and points on the partial input images.

(2) In the corresponding point determination step, the degree-of-similarity images are updated while repeating recursive cumulative summing of the pixel values of the degree-of-similarity images in the vertical direction and the horizontal direction, the positions of pixels having the maximum pixel values of the pixels constituting the degree-of-similarity images are calculated, and the positions are determined as corresponding points on the partial input images. As conditions to end the repeating process, a non-transformation coefficient is used as a measure. The non-transformation coefficient is a value calculated on the basis of a distance (average of distances in all the pixels) between the corresponding points of the input image and the reference image. It is 100% when no transformation occurs, i.e., when the corresponding points need not be moved. It is close to 0 as transformation increases.

(3) In the collation step, a transformation-corrected image is formed by performing correction to absorb transformation on the basis of the corresponding points calculated in the corresponding point determination step, a collation value is calculated from a coincidence coefficient between the transformation-corrected image and the reference image and a non-transformation coefficient between the input image and the reference image, and the signature of the reference image and the signature of the input image on the basis of the collation value are displayed such that these signatures overlap. The coincidence coefficient mentioned here is an overlapping ratio of the transformation-corrected image to the reference image. The coincidence coefficient is 100% when the transformation-corrected image and the reference image completely coincide with each other. The collation value is a product of the coincidence coefficient and the non-transformation coefficient (coincidence coefficient×non-transformation coefficient).

In this manner, when the corresponding points are determined, optimization is performed more generally in the embodiment than in a conventional technique. For this reason, a local minimum problem does not easily occur, a corresponding accuracy is improved by fine adjustment of optimization performed by repeating cumulative summing, and parallel and distributed processes can be performed. Therefore, these processes can be easily constituted as hardware. When the collation is performed, a collation process is performed on the basis of the collation value calculated from the coincidence coefficient between the transformation-corrected image and the reference image and the non-transformation coefficient between the input image and the reference image. For this reason, an accurate decision of truth or falsehood in consideration of transformation of the input image can be efficiently performed.

The configuration of the signature collation apparatus 100 shown in FIG. 1 will be explained below. It is assumed that a reference image and an input image are input in the order named. As shown in FIG. 1, the signature collation apparatus 100 is constituted by an image input section 101, a dividing process section 102, a reference image storage section 103, a degree-of-similarity image forming section 104, a cumulative summing process section 105, a corresponding point determination section 106, a transformation-corrected image forming section 107, a coincidence coefficient calculation section 108, a non-transformation coefficient calculation section 109, a collation value calculation section 110, and a display process section 111.

The image input section 101 is an input section which inputs a reference image $I_0$ (i, j) and an input image $I_1$ (i, j) ($0 \leq i \leq I-1$, $0 \leq j \leq J-1$) each having longitudinal and latitudinal sizes I and J. More specifically, the image input section 101 corresponds to a scanner which optically reads an original to acquire an image, an interface section which acquires an image from a network, or a reading section which reads an image from a secondary storage device. The input image is an image in which corresponding points are searched, and may have distortion or transformation. In contrast to this, the reference image is an image to be compared with the input image, and is desirably free from distortion or the like.

Figure 2B:
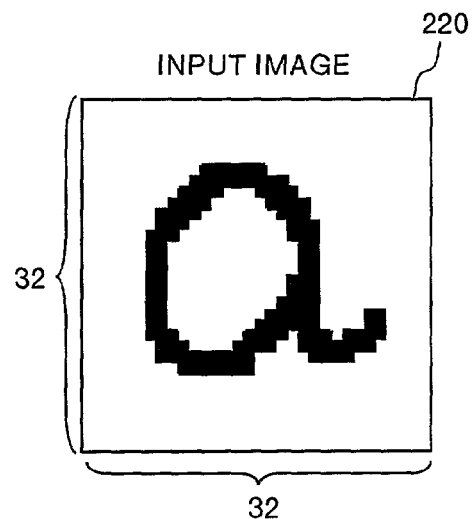

FIG. 2A shows a reference image 210. FIG. 2B shows an input image 220. The reference image 210 and the input image 220 are character images of "a" of the alphabet, and each constituted by, e.g., 32×32 pixels.

The dividing process section 102 is a process section which divides the input image and the reference image which are input by the image input section 101 into partial input images and partial reference images, respectively. A dividing procedure for the input image and a dividing procedure for the reference image are different from each other.

Figure 3:
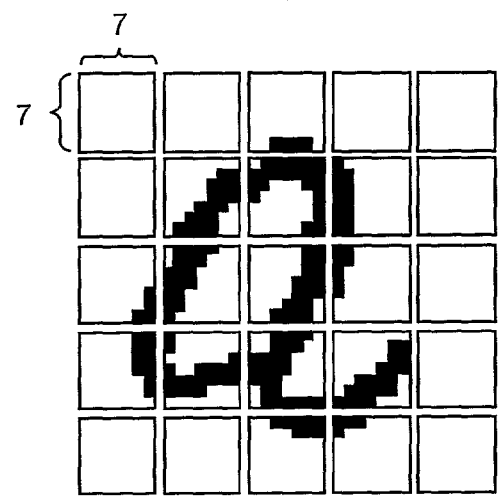
FIG. 3 is a diagram which shows partial reference images.

When the reference image is divided, partial reference images are formed around points ($p_m$, $q_n$) ($0 \leq m \leq M-1$, $0 \leq n \leq N-1$) obtained by performing sampling M times in the longitudinal direction and N times in the latitudinal direction on the reference image. FIG. 3 is a diagram which shows an example of a division result of the reference image 210 shown in FIG. 2A. As shown in FIG. 3, the reference image 210 having 32×32 pixels is divided into 25 partial reference images each having 7×7 pixels. More specifically, $P_m$=round (I/M) and $q_n$=round (J/N) are satisfied, and "round ( )" represents round.

Figure 4:
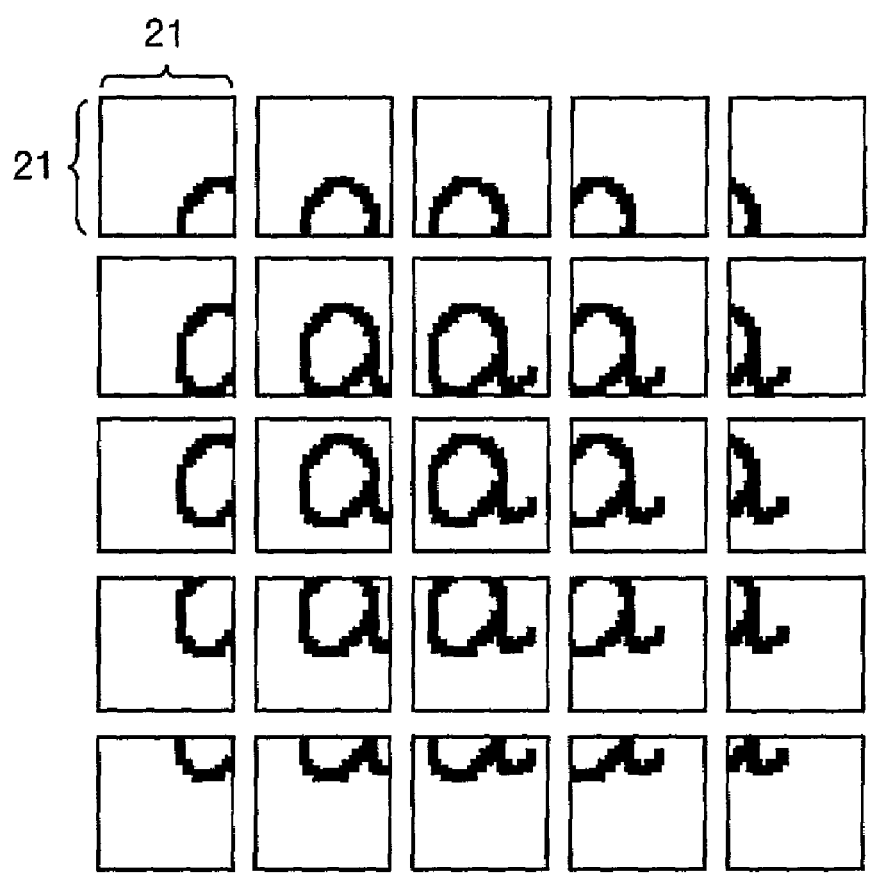
FIG. 4 is a diagram which shows partial input images.

The input image is divided by a manner different from the manner of division of the reference image. The input image is divided such that it obtains an overlapping data where the input images partially overlap. FIG. 4 is a diagram which shows a division result of the input image 220 shown in FIG. 4. As shown in FIG. 2B, the input image 220 having 32×32 pixels is divided into 25 partial input images each having 21×21 pixels.

The reference image storage section 103 is a storage section which stores the reference image and the respective partial reference images obtained by dividing by the dividing process section 102. When a degree-of-similarity image is formed by the degree-of-similarity image forming section 104, a corresponding partial reference image is extracted. When the coincidence coefficient calculation section 108 calculates a coincidence coefficient, when the non-transformation coefficient calculation section 109 calculates a non-transformation coefficient, and when the display process section 111 performs a display process to an overlap image, the reference image is extracted.

The degree-of-similarity image forming section 104 is a process section which calculates the degree of similarity in consideration of transformation between a partial input image and a partial reference image to form a degree-of-similarity image Cmn (u, v) ($0 \leq m \leq M-1$, $0 \leq n \leq N-1$, $0 \leq u \leq U-1$, $0 \leq v \leq V-1$) having the degree of similarity as a pixel value. Reference symbols U and V represent the longitudinal and latitudinal sizes of the degree-of-similarity image, respectively. As the degree of similarity, a normalized correlation coefficient ($\sigma_{fg}/(\sigma_f \sigma_g)$) can be used.

Figure 5:
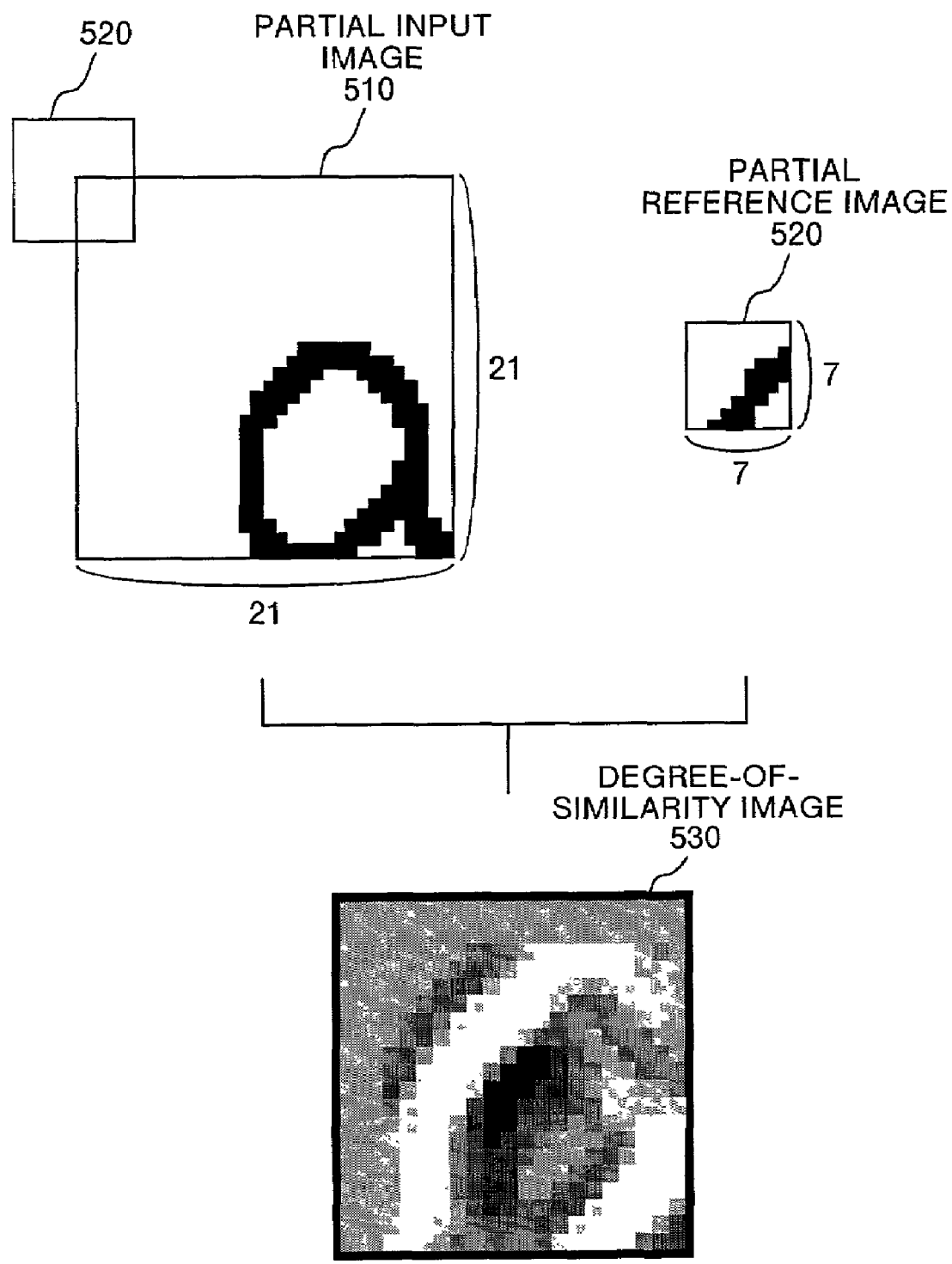
FIG. 5 is a diagram which explains a formation concept of a degree-of-similarity image.

FIG. 5 is a diagram which explains a formation concept of a degree-of-similarity image from a partial reference image and a partial input image. It is assumed that the partial input image and the partial reference image arranged in two rows and two columns in FIGS. 3 and 4 are used.

When the degree of similarity between a partial input image 510 and a partial reference image 520 which are shown in FIG. 5 are obtained, a normalized correlation coefficient is calculated such that the central pixel of the partial reference image 520 corresponds to an upper left pixel of the partial input image 510, and the calculation result is set as a pixel value of an upper left pixel of the degree-of-similarity image 530. Thereafter, the partial reference image 520 is shifted to the right, and the same process as described above is performed. The process is performed to all the pixels of the partial input image 510 while the partial reference image 520 is shifted, so that a degree-of-similarity image 530 is obtained.

Figure 6:
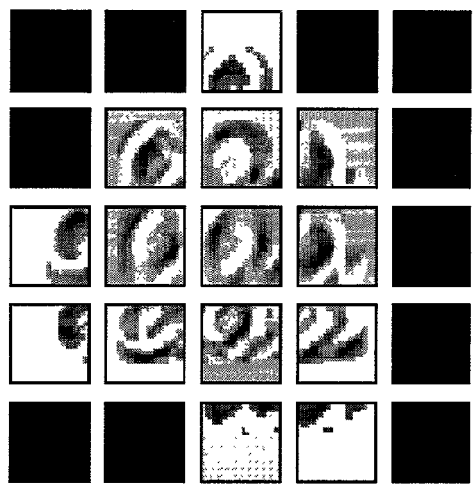
FIG. 6 is a diagram which shows degree-of-similarity images corresponding to the partial input images shown in FIG. 4.

When the forming process of the degree-of-similarity image is performed to the respective partial input images, a plurality of degree-of-similarity images as shown in FIG. 6 are obtained. When the pixel values of all the pixels of the partial reference image are constant values, the denominator of the normalized correlation coefficient becomes zero. For this reason, the pixel value of the degree-of-similarity image is also zero.

Figure 7:
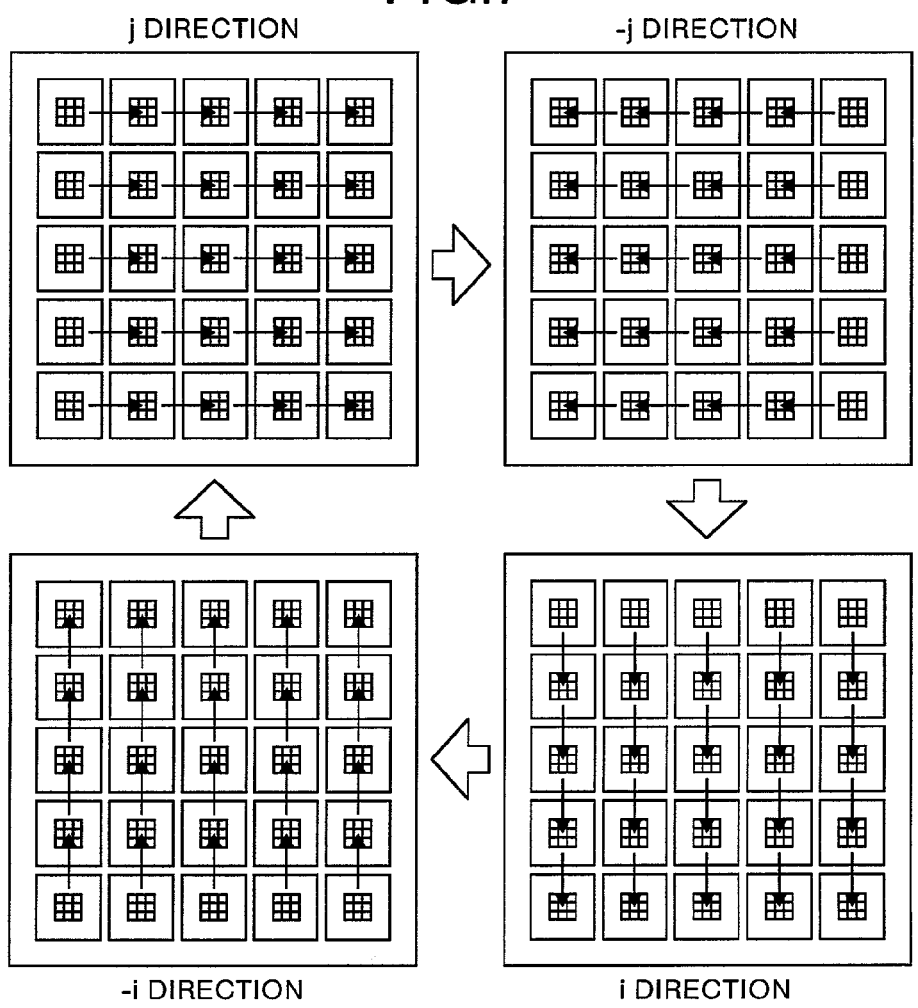
FIG. 7 is a diagram which explains a cumulative summing procedure.

The cumulative summing process section 105, as shown in FIG. 7, is a process section which performs recursive cumulative summing to the degree-of-similarity images in a j-direction, a –j-direction, an i-direction, and a –i-direction in the order named. More specifically, when the cumulative summing is performed in the j-direction, with respect to degree-of-similarity images of n=1 to N–1, $$C_{mn}(u, v) = C_{mn}(u, v) + \alpha \cdot \text{Max}(C_{mn-1}(p, q))$$

is sequentially recursively calculated. In this equation, Max (0) represents the maximum value, α represents a constant, and $0 \leq u \leq U-1$, $0 \leq v \leq V-1$, $0 \leq m \leq M-1$, $0 \leq n \leq N-1$, $u-1 \leq p \leq u+1$, and $v-1 \leq q \leq v+1$ are satisfied.

Figure 8:
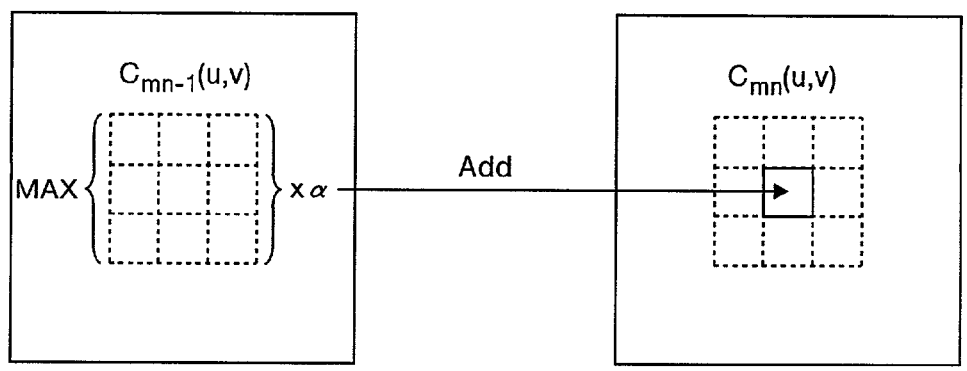
FIG. 8 is a diagram which explains a cumulative summing procedure in a j-direction.

More specifically, when cumulative summing is performed in the j-direction, the following process is recursively repeated. That is, as shown in FIG. 8, the maximum pixel value of 3×3 pixels around $C_{mn-1}$ (p, q) is calculated, the maximum pixel value is multiplied by α, and the resultant value is added to the pixel value of a pixel $C_{mn}$ (p, q)

Figure 9:
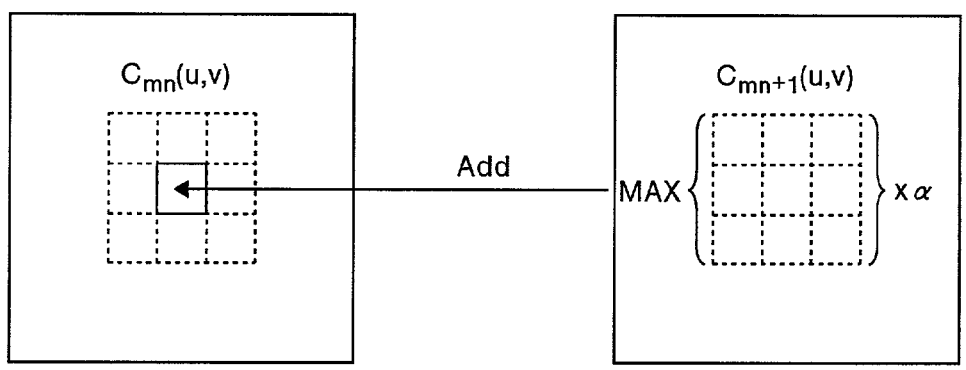
FIG. 9 is a diagram which explains a cumulative summing procedure in a –j-direction.

When cumulative summing is performed in the –j-direction, with respect to degree-of-similarity images of n=N–2 to 0, $$C_{mn}(u, v) = C_{mn}(u, v) + \alpha \cdot \text{Max}(C_{mn+1}(p, q))$$

is sequentially recursively calculated. In this equation, $0 \leq u \leq U-1$, $0 \leq v \leq V-1$, $0 \leq m \leq M-1$, and $0 \leq n \leq N-2$ are satisfied. More specifically, when cumulative summing is performed in the −j-direction, the following process is recursively repeated. That is, as shown in FIG. 9, the maximum pixel value of 3×3 pixels around a pixel $C_{mn+1}$ (p, q) is calculated, the maximum pixel value is multiplied by α, and the resultant value is added to the pixel value of a pixel $C_{mn}$ (p, q).

Figure 10:
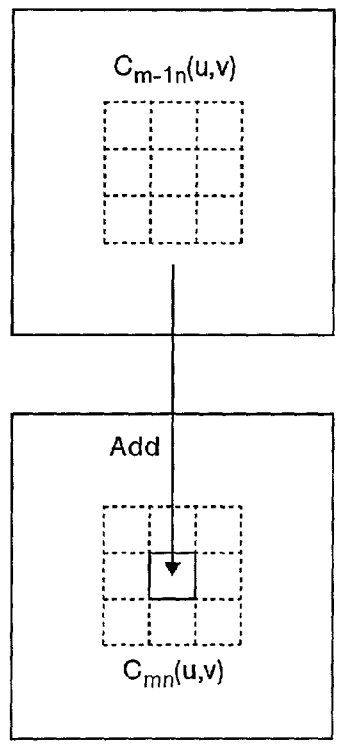
FIG. 10 is a diagram which explains a cumulative summing procedure in an i-direction.

When cumulative summing is performed in the i-direction, with respect to degree-of-similarity images of m=1 to M−1, $$C_{mn}(u, v) = C_{mn}(u, v) + \alpha \cdot \text{Max}(C_{m-1n}(p, q))$$

is sequentially recursively calculated. In this equation, $0 \leq u \leq U-1$, $0 \leq v \leq V-1$, $1 \leq m \leq M-1$, and $0 \leq n \leq N-1$ are satisfied. More specifically, when cumulative summing is performed in the i-direction, the following process is recursively repeated. That is, as shown in FIG. 10, the maximum pixel value of 3×3 pixels around a pixel $C_{m-1n}$ (p, q) is calculated, the maximum pixel value is multiplied by α, and the resultant value is added to the pixel value of a pixel $C_{mn}$ (p, q).

Figure 11:
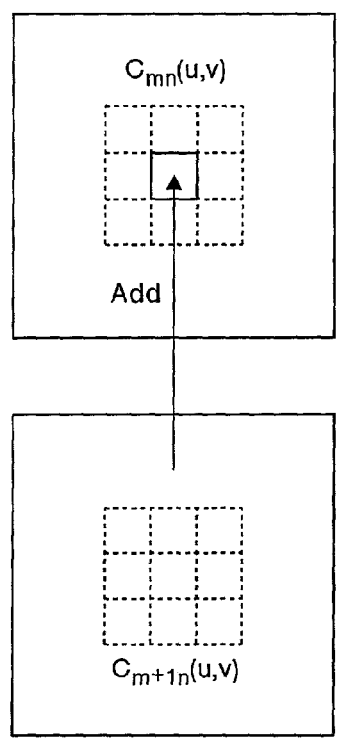
FIG. 11 is a diagram which explains a cumulative summing procedure in a –i-direction.

When cumulative summing is performed in the −i-direction, with respect to degree-of-similarity images of m=M−2 to 0, $$C_{mn}(u, v) = C_{mn}(u, v) + \alpha \cdot \text{Max}(C_{m+1n}(p, q))$$

is sequentially recursively calculated. In this equation, $0 \leq u \leq U-1$, $0 \leq v \leq V-1$, $0 \leq m \leq M-2$, and $0 \leq n \leq N-1$ are satisfied. More specifically, when cumulative summing is performed in the −i-direction, the following process is recursively repeated. That is, as shown in FIG. 11, the maximum pixel value of 3×3 pixels around a pixel $C_{m+1n}$(p, q) is calculated, the maximum pixel value is multiplied by α, and the resultant value is added to the pixel value of a pixel $C_{mn}$ (p, q).

The corresponding point determination section 106 is a process section which determines corresponding points on the basis of the degree-of-similarity images after the cumulative summing in cooperation with the cumulative summing process section 105 or the like. More specifically, the positions (corresponding points) of the maximum values of the respective degree-of-similarity images are detected when the cumulative summing processes are performed in the respective directions. The cumulative summing process is fed back and repeated until a change (described later) in non-transformation coefficient is a predetermined value or less. The repetition is ended when the change is the predetermined value or less. The positions of the maximum values of the degree-of-similarity images are determined as final corresponding points.

Figure 12:
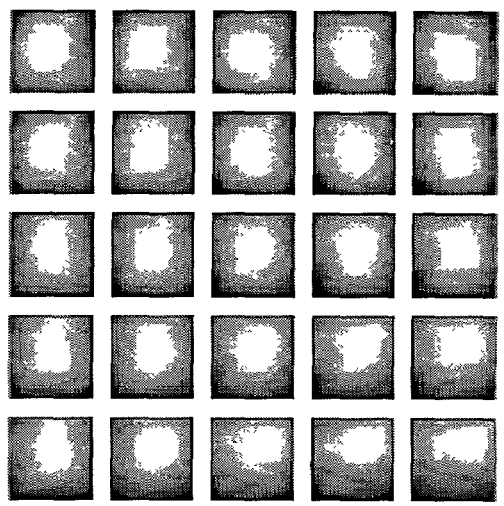
FIG. 12 is a diagram which shows a degree-of-similarity image obtained after a cumulative summing procedure.
Figure 13:
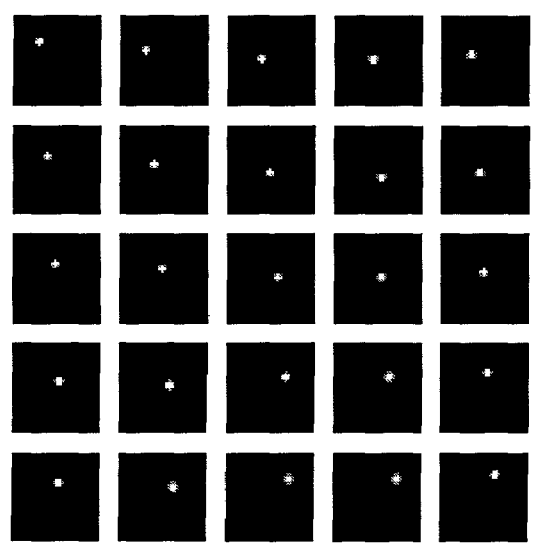
FIG. 13 is a diagram which shows the positions of maximum values of the degree-of-similarity image shown in FIG. 12.
Figure 14A:
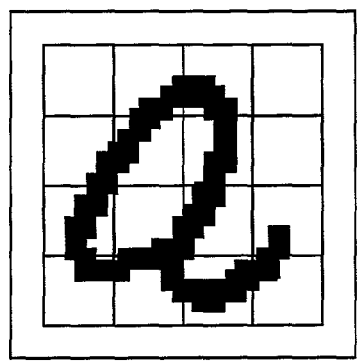
FIGS. 14A and 14B are diagrams which show distortion (transformation) of an input image restructured on the basis of corresponding points.
Figure 14B:
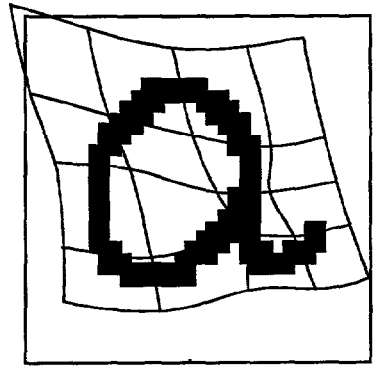

For example, when the degree-of-similarity images shown in FIG. 12 are obtained, when the change in non-transformation coefficient falls within a predetermined range or is smaller than the predetermined range, as shown in FIG. 13, the positions of the maximum values of the degree-of-similarity images are calculated to be determined as the corresponding points. Distortion (transformation) of an input image based on the corresponding points is illustrated in FIGS. 14A and 14B.

The transformation-corrected image forming section 107 is a process section which forms a transformation-corrected image obtained by correcting distortion of an input image on the basis of the corresponding points determined by the corresponding point determination section 106. For example, when the transformation shown in FIG. 14B exists, correction is performed such that transformed mesh-like lines are changed into rectangular lines. As a result, a transformation-corrected image shown in FIG. 14A can be formed.

The coincidence coefficient calculation section 108 is a process section which calculates a coincidence coefficient between the transformation-corrected image formed by the transformation-corrected image forming section 107 and the reference image stored in the reference image storage section 103. As has been described above, the coincidence coefficient is an overlapping ratio of the transformation-corrected image to the reference image. When the transformation-corrected image completely coincides with the reference image, coincidence coefficient is 100%.

The non-transformation coefficient calculation section 109 is a process section which obtains a non-transformation coefficient between the input image and the reference image stored in the reference image storage section 103. As has been described above, the non-transformation coefficient is a value calculated on the basis of a distance (average of distances in all the pixels) between the corresponding points of the input image and the reference image. When any transformation does not occur, i.e., when the corresponding points need not be moved, it is 100%. It is close to 0 as transformation increases. When the change of the non-transformation coefficient is not a predetermined value or less, the non-transformation coefficient calculation section 109 instructs the cumulative summing process section 105 to continue the repeating process. When the change becomes the predetermined value or less, the non-transformation coefficient calculation section 109 outputs the coincidence coefficient and the non-transformation coefficient to the collation value calculation section 110.

The collation value calculation section 110 is a process section which calculates a product of the coincidence coefficient calculated by the coincidence coefficient calculation section 108 and the non-transformation coefficient calculated by the non-transformation coefficient calculation section 109 and outputs the result to the display process section 111 as a collation value.

Figure 15:
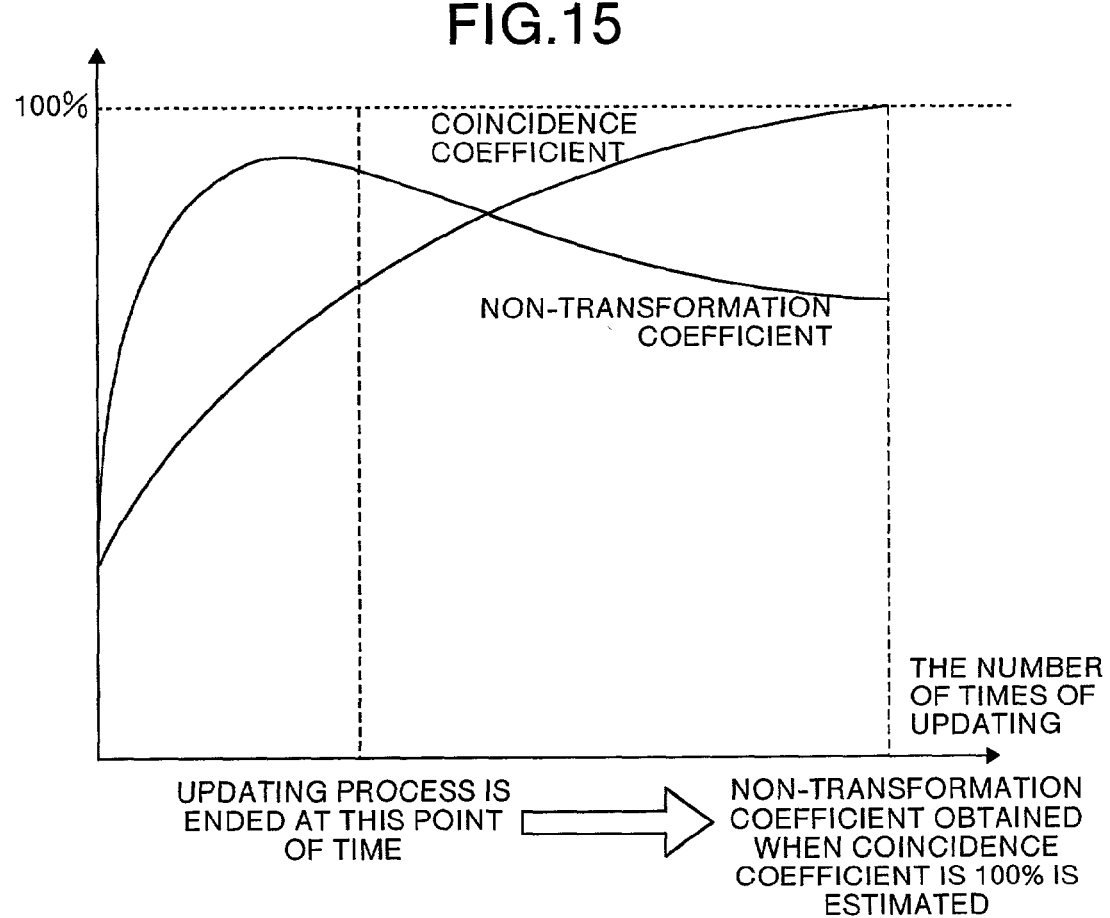
FIG. 15 is a graph which explains the concept of a collation value calculated by the collation value calculation section shown in FIG. 1.

FIG. 15 is a diagram which explains the concept of a collation value calculated by the collation value calculation section 110. As shown in FIG. 15, the coincidence coefficient is close to 100% as the number of times of updating, i.e., the number of times of feedback to calculate corresponding points. This is because when the number of times of updating increases, the corresponding points are accurately calculated. The non-transformation coefficient is close to a predetermined value (e.g., 70%) as the number of times of updating increases. This is because, for example, when the degree of transformation is 70%, the accuracy at which the degree of transformation (70%) is calculated increases in proportion to the accuracy at which the corresponding points are calculated.

It is essentially desired that a non-transformation coefficient is calculated after the corresponding points are made completely equal to each other, in other words, a non-transformation coefficient is calculated after the coincidence coefficient is 100%. However, this is not efficient because the number of times of updating is considerably increased to perform such process. Therefore, in this embodiment, feedback is stopped when the non-transformation coefficient does not largely change to estimate a non-transformation coefficient in such a state that the coincidence coefficient is made 100% by using the product (coincidence coefficient×non-transformation coefficient) of the coincidence coefficient and the non-transformation coefficient. Therefore, the estimated value is a collation value. A value obtained by simply adding the coincidence coefficient and the non-transformation coefficient to each other is not used as the collation value, and the product of the coefficients is used as the collation value because a change in coincidence coefficient is directly reflected on the non-transformation coefficient to end the repeating process with a proper number of times of updating.

The display process section 111 is a process section which displays a transformation-corrected image formed by the transformation-corrected image forming section 107 when the feedback process is ended and the reference image on a display section (not shown) such that the images overlap. More specifically, when the collation value calculated by the collation value calculation section 110 is a predetermined threshold value or more, the signature of the input image is decided as a true signature, and the transformation-corrected image and the reference image are displayed such that these images overlap. When the collation value is smaller than the threshold value, the signature is decided to be false, and it is displayed that the signature is false. Even though it is decided that the signature is false on the display section, the transformation-corrected image and the reference image can also be displayed such that these images overlap.

An overlapping portion of the signatures are displayed red, the signature part of only the transformation-corrected image is displayed blue, and the signature part of only the reference image is displayed yellow. When the classification by color is categorized as described above, a user can easily decide whether the signature is true or false.

The display process section 111 displays not only the overlapping image but also the collation value on the display section. This is because, when a user wonders whether the signature is true or false, the collation value is offered to the user as an objective indicator for the decision of truth or falsehood.

As described above, in the signature collation apparatus 100 according to the embodiment, in order to secure the accuracy of a signature collation result, a decision of truth or falsehood is not performed by simply comparing a collation value with a predetermined threshold value, but a transformation-corrected image and the reference image are displayed such that these images overlap to make a user to decide the result of the decision of truth or falsehood.

The procedure of the signature collation apparatus 100 shown in FIG. 1 will be explained below. Although the above description will be repeated, the procedure will be explained below while exemplifying the flow of processes with reference to FIGS. 2 to 14.

Figure 16:
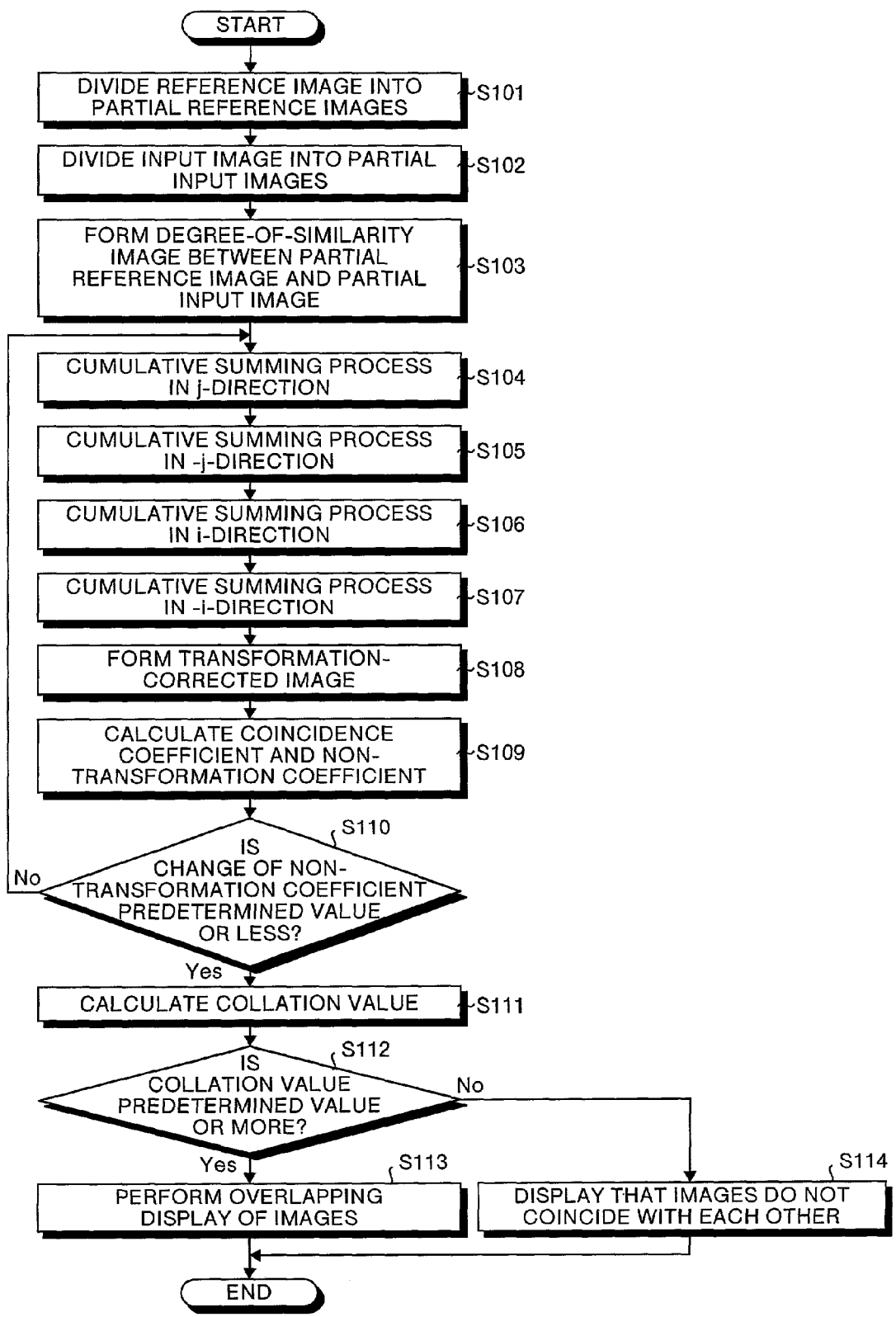
FIG. 16 is a flow chart which shows a procedure of the signature collation apparatus shown in FIG. 1.

FIG. 16 is a flow chart which shows the procedure of the signature collation apparatus 100 shown in FIG. 1. As shown in FIG. 16, when the signature collation apparatus 100 acquires a reference image and an input image, the signature collation apparatus 100 divides the reference image into partial reference images (step S101) For example, the signature collation apparatus 100 stores the reference image 210 having 32×32 pixels shown in FIG. 2A which are divided into 25 partial reference images each having 7×7 pixels. The partial reference image may be stored in advance in every images to be referred to, otherwise, the partial reference images are not stored and only the reference image may be stored separately in advance, and the stored reference image may be divided into partial reference images when the degree of similarity between an input image (to be described later) and the reference image.

Thereafter, the input image is divided into partial input images (step S102). For example, the input image 220 having 32×32 pixels shown in FIG. 2B is divided into 25 partial input images each having 21×21 pixels shown in FIG. 4.

Degree-of-similarity images between the partial reference images and the partial input images are formed (step S103). For example, as shown in FIG. 5, the degree-of-similarity image 530 including the degree of similarity between the partial input image 510 and the partial reference image 520 as a pixel value is formed every partial input image to form a plurality of degree-of-similarity images shown in FIG. 6.

Thereafter, a j-direction cumulative summing procedure (step S104), an −j-direction cumulative summing procedure (step S105), an i-direction cumulative summing procedure (step S106), and an −i-direction cumulative summing procedure (step S107) are performed to detect the positions of the maximum values of the degree-of-similarity images. More specifically, the summing procedures shown in FIGS. 8 to 11 are recursively repeated as shown in FIG. 7 to form degree-of-similarity images as shown in FIG. 12. As shown in FIG. 13, corresponding points which represent the positions of the maximum values of the degree-of-similarity images are detected.

A transformation-corrected image is formed on the basis of the corresponding points (step S108), and a coincidence coefficient and a non-transformation coefficient between the transformation-corrected image and the reference image are calculated (step S109). It is checked whether the change of non-transformation coefficient is a predetermined value or less or not (step S110). When the change is not the predetermined value or less (NO in step S110), it shifts to step S104 to repeat the same processes as described above.

In contrast to this, when the change is the predetermined value or less (YES in step S110), the coincidence coefficient is multiplied by the non-transformation coefficient to calculate a collation value (step S111). It is checked whether the collation value is a predetermined value or more or not (step S112). When the collation value is the predetermined value or more (YES in step S112), the signature of the input image is decided as a true signature, and the transformation-corrected image and the reference image are displayed such that these images overlap (step S113). When the collation value is not the predetermined value or more (NO in step S112), the signature of the input image is decided to be false, and it is displayed that they do not coincide (step S114).

Figure 17:
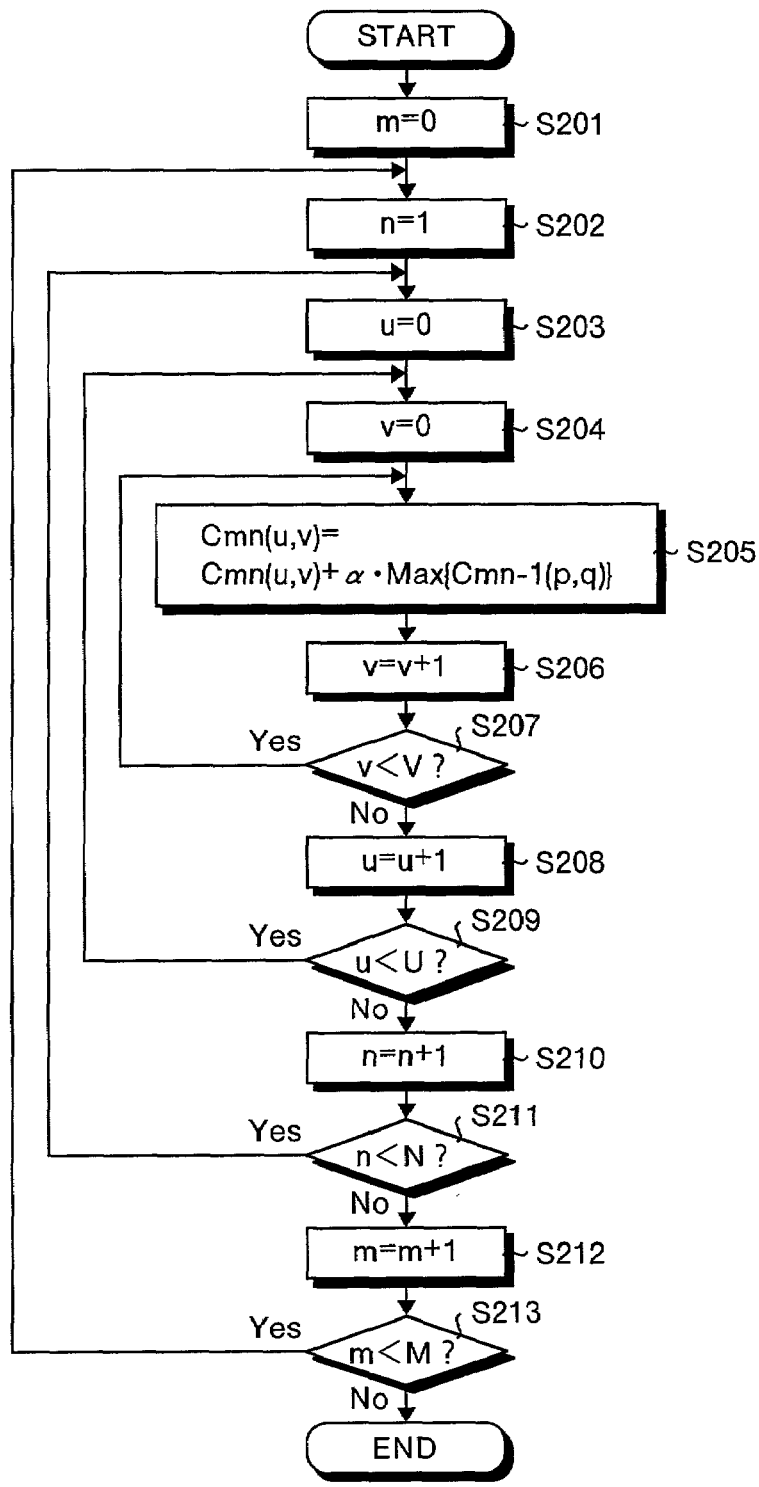
FIG. 17 is a flow chart which shows an example of a cumulative summing procedure.

The j-direction cumulative summing procedure performed by the cumulative summing process section 105 shown in FIG. 1 will be explained below. FIG. 17 is a flow chart which shows the j-direction cumulative summing procedure performed by the cumulative summing process section 105 shown in FIG. 1. The −j-direction, i-direction, and −i-direction cumulative summing procedures can be performed similarly.

As shown in FIG. 17, initialization is performed such that variables m, u, and v are set to be 0, and a variable n is set to be 1 (step S201 to S204). The variable m is a variable used as an i-direction index, and the variable m is a variable used as a j-direction index. The variables u and v are i- and j-direction variables representing a searching area.

Upon completion of the initialization, calculation is performed by the following equation, $$C_{mn}(u, v) = C_{mn}(u, v) + \alpha \cdot \text{Max}(C_{mn-1}(p, q))$$

(step S205).

Thereafter, the variable v is incremented (step S206). When the variable v is smaller than V (YES in step S207), it shifts to step S205 to repeat the summing process. More specifically, the searching area is shifted in the j-direction.

In contrast to this, when the variable v is V or more (NO in step S207), the variable u is incremented (step S208). When the variable u is smaller than U (YES in step S209), it shifts to step S204 to repeat the summing process. More specifically, the searching area is shifted in the i-direction.

When the variable u is larger than U (NO in step S209), calculation for a certain pixel is ended, and it shifts to calculation for the next pixel. More specifically, the variable n is increamented to shift an interested pixel in the j-direction (step S210). The variable n is compared with N (step S211). When the variable n is smaller than N (YES in step S211), it shifts to step S203 to repeat the summing process.

In contrast to this, when the variable n is N or more (NO in step S211), the variable m is incremented to shift an interested pixel in the i-direction (step S212). Thereafter, when the variable m is smaller than M (YES in step S213), it shifts to step S202 to repeat the summing process. When the variable m is M or more (NO in step S213), the process is ended. The above series of processes are performed, so that j-direction cumulative summing results of all the pixels of the degree-of-similarity images can be obtained.

A signature collation result obtained by the signature collation apparatus 100 shown in FIG. 1 will be explained in more detail. FIGS. 18A to 18C and FIG. 19 are diagram which explain a signature collation result obtained by the signature collation apparatus 100. For descriptive convenience, an overlapping display of the transformation-corrected image and the reference image is performed every update.

Figure 18A:
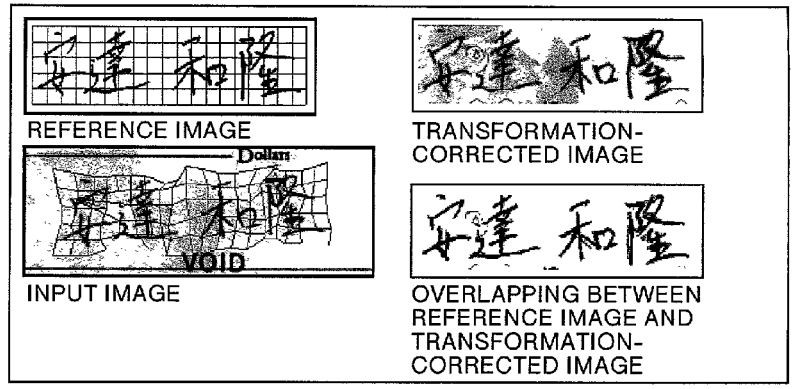
FIGS. 18A to 18C are diagrams which explain an example of a signature collation result obtained by the signature collation apparatus shown in FIG. 1.

As shown in FIG. 18A, in the initial state, as is apparent from the input image shown in FIG. 18A, since corresponding points are largely offset, the overlapping part between the transformation-corrected image and the reference image becomes small, and the coincidence coefficient becomes low, i.e., 75.3%. Since the distance between the transformation-corrected image and the reference image is large, a non-transformation coefficient is small, i.e., 25.1%.

Figure 18B:
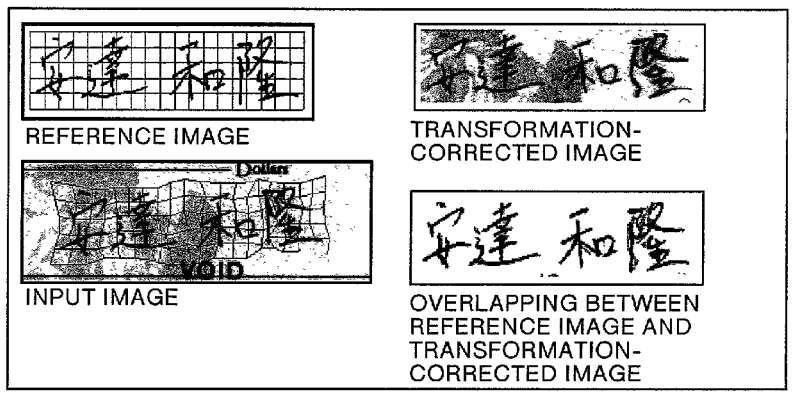

In contrast to this, as shown in FIG. 18B, when the third updating is performed, corresponding points can be somewhat accurately calculated. For this reason, the overlapping part of the transformation-corrected image and the reference image is larger than that in the initial state, and the coincidence coefficient is 79.2%. Since the distance between the transformation-corrected image and the reference image is shorter than that in the initial state, the non-transformation coefficient is improved to 44.4%.

Figure 18C:
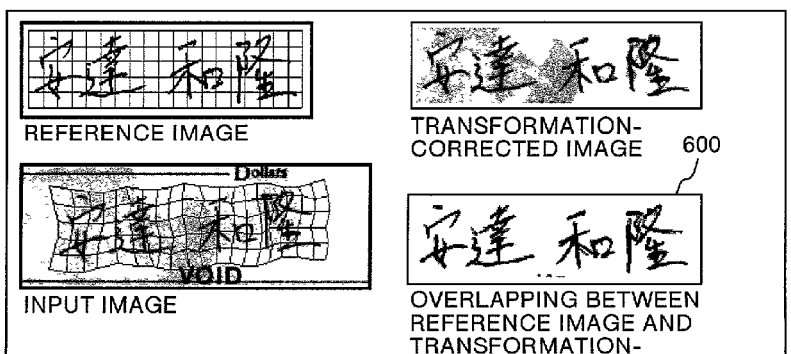

In addition, as shown in FIG. 18C, when the tenth updating is performed, corresponding points can be considerably accurately calculated. For this reason, the overlapping part of the transformation-corrected image and the reference image is large, and the coincidence coefficient is 79.6%. Since the distance between the transformation-corrected image and the reference image becomes further small, the non-transformation coefficient is improved to 85.7%.

Figure 19:
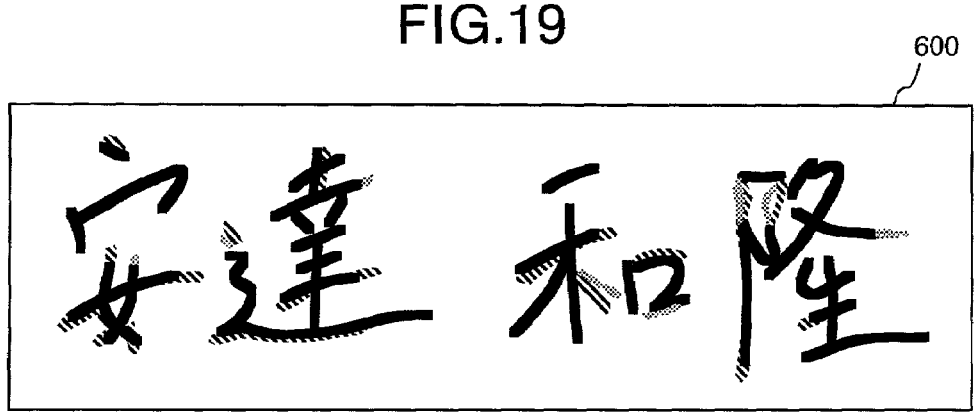
FIG. 19 is a diagram which explains an example of a signature collation result obtained by the signature collation apparatus shown in FIG. 1.

Therefore, with reference to an overlapping display 60 between the transformation-corrected image and the reference image shown in FIG. 18C, as enlargely shown in FIG. 19, the signatures overlap in many parts, and parts that do not overlap become small. When the display is visually checked by a user, a decision of truth or falsehood for a signature can be efficiently performed. When the respective parts are classified by color, the user can more efficiently know the degree of coincidence between the signatures.

As has been described above, according to this embodiment, a reference image and an input image are input from the image input section 101, and partial reference images and partial input images are formed by the dividing process section 102. Degree-of-similarity images in which the degrees of similarity between the partial reference images and the partial input images are calculated are formed by the degree-of-similarity image forming section 104, and cumulative summing processes for the plurality of degree-of-similarity images are recursively performed by the cumulative summing process section 105. On the basis of the results, the corresponding point determination section 106 determines corresponding points. With this configuration, (1) occasions in which local minimum problems occur can be reduced in number because general optimization is performed, (2) optimization can be finely adjusted by a repeating process, and (3) high-speed processes can be achieved because parallel and distributed processes can be performed.

The transformation-corrected image forming section 107 forms a transformation-corrected image on the basis of the corresponding points determined by the corresponding point determination section 106, and the coincidence coefficient calculation section 108 calculates a coincidence coefficient between the transformation-corrected image and the reference image. The non-transformation calculation section 109 calculates a non-transformation coefficient. It is controlled by the non-transformation coefficient whether feedback is performed or not. When the feedback is ended, the collation value calculation section 110 calculates a collation value (coincidence coefficient×non-transformation coefficient), and the display process section 111 compares the collation value with a predetermined threshold value. When the collation value is the threshold value or more, the signature is decided to be a true signature, and the transformation-corrected image and the reference image are displayed such that these images overlap. For this reason, an accurate decision of truth or falsehood can be efficiently performed in consideration of transformation of the input image.

In this embodiment, for descriptive convenience, such when a reference image and an input image are equal to each other in size has been described. However, the present invention is not limited to this. The present invention can also be applied to when a reference image and an input image are different from each other in size. When it is so, the same processes as described above can be performed.

The embodiment describes such when respective degree-of-similarity images are recursively cumulative-summed in the j-direction, −j-direction, i-direction, and −i-direction in the order named. However, the present invention is not limited to this. The present invention can also be applied to when degree-of-similarity images are cumulative-summed in diagonal directions or only one direction. Even though the cumulative summing is performed in only one direction, constant general information can be obtained by summing the degrees of similarity.

The embodiment describes such when a normalized correlation coefficient is used as the degree of similarity. However, the present invention is not limited to this. Another index such as an Euclidean distance can be used as the degree of similarity.

Time when the cumulative summing is ended is defined as time when a change in non-transformation coefficient falls within a predetermined range or is smaller than the predetermined range. However, changes of the positions of the maximum values of the degree-of-similarity images shown in FIG. 13 are monitored, and cumulative summing may be ended when the changes fall within the predetermined range or are smaller than the predetermined range with respect to all of the blocks.

In the non-transformation coefficient calculation section 109, a non-transformation coefficient is calculated on the basis of a distance between the corresponding points of an input image and a reference image. However, this calculation may be performed simultaneously with the step of forming a transformation-corrected image in the transformation-corrected image forming section 107. Although the non-transformation coefficient is used, collation may be performed by using a transformation coefficient.

As described above, according to the present invention, corresponding points between an input image and a reference image are searched, and, on the basis of a coincidence coefficient between a transformation-corrected image obtained by correcting transformation of a signature of an input image on the basis of the searched corresponding points and the reference image and a non-transformation coefficient between the input image and the reference image, a collation value between the transformation-corrected image and the reference image is calculated. For this reason, an accurate decision of truth or falsehood can be efficiently performed in consideration of transformation of the input image.

According to the present invention, a transformation-corrected image obtained by correcting transformation of the input image on the basis of the searched corresponding points is formed, a coincidence coefficient between the formed transformation-corrected image and the reference image and the non-transformation coefficient between the input image and the reference image is calculated, and the coincidence coefficient is multiplied by the non-transformation coefficient to calculate a collation value. For this reason, a signature collation apparatus which can directly reflect a change in coincidence coefficient on a non-transformation coefficient can be obtained.

According to the present invention, it is decided that the signature of the input image and the signature of the reference image coincide with each other when the calculated collation value is the predetermined value or more, and it is decided that the signature of the input image and the signature of the reference image do not coincide with each other when the collation value is smaller than the predetermined value. For this reason, a signature collation apparatus which can rapidly and efficiently perform a decision of truth or falsehood for signatures can be obtained.

According to the present invention, when it is decided that the signature of the input image and the signature of the reference image coincide with each other, the transformation-corrected image and the reference image are displayed such that these images overlap. For this reason, a final result of the decision of truth or falsehood can be displayed such that the result can be easily understood. Therefore, a signature collation apparatus which can make it easy to perform a decision of truth or falsehood by a user can be obtained.

According to the present invention, a plurality of degree-of-similarity images each having the degree of similarity of the input image and the reference image as a pixel value are formed, pixel values of peripheral pixels of the pixels of the plurality of degree-of-similarity images arranged in a predetermined direction and pixel values of other degree-of-similarity images are sequentially cumulative-summed, and corresponding points are specified on the basis of the degree-of-similarity images subjected to cumulative summing. For this reason, a signature collation apparatus which can rapidly obtain a stable correspondence result without any local minimum problem when the correspondence between images is made can be obtained.

According to the present invention, the reference image is divided into a plurality blocks to form partial reference images, the input image is divided into a plurality of blocks to form partial input images, and the degrees of similarity between the partial input images and the partial reference images are calculated. For this reason, a signature collation apparatus which can perform high-speed processes by repeating processes for the blocks can be obtained.

According to the present invention, cumulative summing in a latitudinal direction (j-direction), a direction (−j-direction) opposite to the latitudinal direction, a longitudinal direction (i-direction), and a direction (−i-direction) opposite to the longitudinal direction are recursively repeated until a change of the non-transformation coefficient is smaller than the predetermined value. For this reason, a signature collation apparatus which can end the recursive processes by the non-transformation coefficient representing the degree of transformation while finely adjusting optimization by a repeating process can be obtained.

According to the present invention, corresponding points between the input image and the reference image are searched, and, on the basis of a transformation-corrected image obtained by correcting transformation of the signature of the input image on the basis of the searched corresponding points, coincidence coefficient of the reference image and a non-transformation coefficient between the input image and the reference image, a collation value between the transformation-corrected image and the reference image is calculated. For this reason, a signature collation method which can efficiently perform an accurate decision of truth or falsehood in consideration of transformation of an input image can be obtained.

According to the present invention, a transformation-corrected image obtained by correcting transformation of the input image is formed on the basis of the searched corresponding points, a coincidence coefficient between the formed transformation-corrected image and the reference image and a non-transformation coefficient between the input image and the reference image are calculated, and a collation value is calculated by multiplying the coincidence coefficient by the non-transformation coefficient. For this reason, a signature collation method which can directly reflect a change in coincidence coefficient on a non-transformation coefficient can be obtained.

According to the present invention, a program which can cause a computer to execute the method described above can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signature collation apparatus which performs, on the basis of the degree of coincidence between an input image of a signature and a reference image of a signature to be compared with said input image, signature collation between the input image and the reference image, comprising:
   a corresponding point searching unit which searches corresponding points between the input image and the reference image; and
   a calculation unit which, on the basis of a transformation-corrected image obtained by correcting transformation of the signature of the input image on the basis of the corresponding points searched by said corresponding point searching unit, a coincidence coefficient of the reference image and a non-transformation coefficient between the input image and the reference image, calculates a collation value between the transformation-corrected image and the reference image.

2. The signature collation apparatus according to claim 1, wherein
said calculation unit includes:
a transformation-corrected image forming unit which forms a transformation-corrected image obtained by correcting transformation of the input image on the basis of the corresponding points searched by said corresponding point searching unit;
a coincidence coefficient calculation unit which calculates a coincidence coefficient between the transformation-corrected image formed by said transformation-corrected image forming unit and the reference image;
a non-transformation coefficient calculation unit which calculates a non-transformation coefficient between the input image and the reference image; and
a collation value calculation unit which calculates a collation value obtained by multiplying the coincidence coefficient by the non-transformation coefficient.

3. The signature collation apparatus according to claim 2, further comprising a decision unit which decides that the signature of the input image and the signature of the reference image coincide with each other when a collation value calculated by said collation value calculation unit is not less than a predetermined value, and which decides that the signature of the input image and the signature of the reference image do not coincide with each other when the collation value is smaller than the predetermined value.

4. The signature collation apparatus according to claim 3, further comprising a display process unit which displays the transformation-corrected image and the reference image such that these images overlap when said decision unit decides that the signature of the input image and the signature of the reference image coincide with each other.

5. The signature collation apparatus according to claim 1, wherein
said corresponding point searching unit includes:
a degree-of-similarity image forming unit which forms a plurality of degree-of-similarity images each having the degree of similarity between the input image and the reference image as a pixel value;
a cumulative summing unit which sequentially cumulative-sums pixel values of peripheral pixels of the pixels of the plurality of degree-of-similarity images arranged in a predetermined direction and pixel values of other degree-of-similarity images; and
a corresponding point specifying unit which specifies corresponding points on the basis of the degree-of-similarity images subjected to cumulative summing by said cumulative summing unit.

6. The signature collation according to claim 5, wherein said degree-of-similarity image forming unit includes:
a partial reference image forming unit which divides the reference image into a plurality blocks to form partial reference images;
a partial input image forming unit which divides the input image into a plurality of blocks to form partial input images; and
a degree-of-similarity calculation unit which calculates the degrees of similarity between the partial input images and the partial reference images.

7. The signature collation apparatus according to claim 5, wherein said cumulative summing unit recursively repeats cumulative summing operations in a latitudinal direction (j-direction), a direction (−j-direction) opposite to the latitudinal direction, a longitudinal direction (i-direction), and a direction (−i-direction) opposite to the longitudinal direction until a change of the non-transformation coefficient calculated by said non-transformation coefficient calculation unit is smaller than the predetermined value.

8. A signature collation method which performs, on the basis of a degree of coincidence between an input image of a signature and a reference image of a signature to be compared with the input image, signature collation between the input image and the reference image, comprising:
a corresponding point searching step of searching corresponding points between the input image and the reference image; and
a calculation step of, on the basis of a transformation-corrected image obtained by correcting transformation of the signature of the input image on the basis of the corresponding points searched by the corresponding point searching step, a coincidence coefficient of the reference image and a non-transformation coefficient between the input image and the reference image, calculating a collation value between the transformation-corrected image and the reference image.

9. The signature collation method according to claim 8, wherein
a calculation step includes:
the transformation-corrected image forming step of forming a transformation-corrected image obtained by correcting transformation of the input image on the basis of the corresponding points searched by the corresponding point searching step;
a coincidence coefficient calculation step of calculating a coincidence coefficient between the transformation-corrected image formed by the transformation-corrected image forming step and the reference image;
a non-transformation coefficient calculation step of calculating a non-transformation coefficient between the input image and the reference image; and
a collation value calculation step of calculating a collation value obtained by multiplying the coincidence coefficient by the non-transformation coefficient.

10. A signature collation program which performs, on the basis of the degree of coincidence between an input image of a signature and a reference image of a signature to be compared with the input image, signature collation between the input image and the reference image, wherein
the signature collation program causes
a computer to execute:
a corresponding point searching procedure to search corresponding points between the input image and the reference image; and
a calculation procedure to, on the basis of a transformation-corrected image obtained by correcting transformation of the signature of the input image on the basis of the corresponding points searched by the corresponding point searching procedure, a coincidence coefficient of the reference image and a non-transformation coefficient between the input image and the reference image, calculate a collation value between the transformation-corrected image and the reference image.

11. The signature collation program according to claim 10, wherein
the calculation procedure causes
a computer to execute:
a transformation-corrected image forming procedure to form a transformation-corrected image obtained by correcting transformation of the input image on the basis of the corresponding points searched by the corresponding point searching procedure;

a coincidence coefficient calculation procedure to calculate a coincidence coefficient between the transformation-corrected image formed by the transformation-corrected image forming procedure and the reference image;

a non-transformation coefficient calculation procedure to calculate a non-transformation coefficient between the input image and the reference image; and a collation value calculation procedure to calculate a collation value obtained by multiplying the coincidence coefficient by the non-transformation coefficient.

* * * * *